United States Patent
Zhu et al.

(10) Patent No.: US 6,199,748 B1
(45) Date of Patent: Mar. 13, 2001

(54) SEMICONDUCTOR EUTECTIC ALLOY METAL (SEAM) TECHNOLOGY FOR FABRICATION OF COMPLIANT COMPOSITE SUBSTRATES AND INTEGRATION OF MATERIALS

(75) Inventors: Zuhua Zhu; Tuoh-Bin Ng; Yu-Hwa Lo, all of Ithaca, NY (US)

(73) Assignee: Nova Crystals, Inc., San Jose, CA (US)

( * ) Notice: Subject to any disclaimer, the term of this patent is extended or adjusted under 35 U.S.C. 154(b) by 0 days.

(21) Appl. No.: 09/378,769

(22) Filed: Aug. 20, 1999

(51) Int. Cl.$^7$ .................................................. B23K 31/02
(52) U.S. Cl. ........................................ 228/121; 228/234.1
(58) Field of Search ................................ 228/121, 122.1, 228/123.1, 124.1, 124.5

(56) References Cited

U.S. PATENT DOCUMENTS

| | | | |
|---|---|---|---|
| 3,987,217 | * 10/1976 | Greeson et al. | 427/90 |
| 3,994,430 | * 11/1976 | Cusano et al. | 228/122 |
| 4,033,503 | * 7/1977 | Fletcher et al. | 228/124 |
| 4,189,130 | * 2/1980 | Watanbe et al. | 266/270 |
| 4,278,195 | * 7/1981 | Singh | 228/123 |
| 4,398,659 | * 8/1983 | Richter | 228/124 |
| 4,602,731 | * 7/1986 | Dockus | 228/121 |
| 4,635,701 | * 1/1987 | Sare et al. | 164/102 |

(List continued on next page.)

FOREIGN PATENT DOCUMENTS

401093004A * 4/1989 (JP) .

OTHER PUBLICATIONS

R. Venkatasubramanian and M.L. Timmons; T.P. Humphreys; B.M. Keyes and R.K. Ahrenkiel High–quality eutectic–metal–bonded AlGaAs–GaAs thin films on Si subtrates, Appl. Phys Lett. vol. 60, No. 7, pp. 886–888, 1992.

Hsi–Jen I Yeh and John S. Smith, Integration of GaAs vertical–cavity surface emitting laser on Si by substrate removal, Appl. Phys. Lett. vol. –64, No. 12, pp. 1466–1468, 1994.

Bao–Vu and Paul M. Zavracky, "Patterned eutectic bonding with Al/Ge thin films for microelectromechanical systems", J. Vac. Sci. Technol. B14, No. 4, pp. 2588–2594, 1996.

Primary Examiner—Patrick Ryan
Assistant Examiner—Kiley Stoner
(74) Attorney, Agent, or Firm—Foley, Hoag & Eliot LLP (57) ABSTRACT

A method of semiconductor eutectic alloy metal (SEAM) technology for integration of heterogeneous materials and fabrication of compliant composite substrates takes advantage of eutectic properties of alloys. Sub1 and Sub2 are used to represent the two heterogeneous materials to be bonded or composed into a compliant composite substrate. For the purpose of fabricating compliant composite substrate, the first substrate material (Sub1) combines with the second substrate material (Sub2) to form a composite substrate that controls the stress in the epitaxial layers during cooling. The second substrate material (Sub2) controls the stress in the epitaxial layer grown thereon so that it is compressive during annealing. A joint metal (JM) with a melting point of $T_m$ is chosen to offer variable joint stiffness at different temperatures. JM and Sub1 form a first eutectic alloy at a first eutectic temperature $T_{eu1}$ while JM and Sub2 form a second eutectic alloy at a second eutectic temperature $T_{eu2}$. $T_{m1}$ and $T_{m2}$ are the melting points of Sub1 and Sub2, respectively. The following condition should be met: $T_{m1}$, $T_{m2} > T_m > T_{eu1}$, $T_{eu2}$. After cleaning of Sub1 and Sub2, JM is deposited on the bonding sides of Sub1 and Sub2. After preliminary bonding by applying force to press the bonding surfaces together at room temperature, high temperature bonding is subsequently performed, during which the temperature is ramped up to a temperature equal to or higher than $T_m$. During cooling, JM solidifies first, after which two eutectic alloys solidify.

16 Claims, 6 Drawing Sheets

U.S. PATENT DOCUMENTS

| | | | |
|---|---|---|---|
| 4,659,406 | * 4/1987 | Reddy | 156/89 |
| 4,921,158 | * 5/1990 | Hwang et al. | 228/124 |
| 5,108,026 | * 4/1992 | Su et al. | 228/122 |
| 5,368,880 | * 11/1994 | McKee et al. | 427/125 |
| 5,372,298 | * 12/1994 | Glaeser | 228/195 |
| 5,418,072 | * 5/1995 | Baldantoni et al. | 428/558 |
| 5,490,627 | * 2/1996 | Krum et al. | 228/124.1 |
| 5,561,321 | * 10/1996 | Hirano et al. | 257/700 |
| 5,693,574 | * 12/1997 | Schuster et al. | 437/225 |

* cited by examiner

SEMICONDUCTOR EUTECTIC ALLOY METAL (SEAM) TECHNOLOGY FOR FABRICATION OF COMPLIANT COMPOSITE SUBSTRATES AND INTEGRATION OF MATERIALS

FIELD OF THE INVENTION

The invention pertains to the field of design and fabrication of composite substrates and integration of materials. More particularly, the invention pertains to a method for making compliant composite semiconductor substrates for heterogeneous epitaxial growth.

BACKGROUND OF THE INVENTION

Epitaxy is a technology for growth of thin crystal film. A variety of advanced electronic and optoelectronic devices are fabricated by using heteroepitaxial thin layer crystal structures. The quality of the epitaxial layers determines the device performance.

In general, the lattice constant and thermal expansion coefficient are the two important factors for the quality of epitaxial layers of materials. The strain induced by the difference in lattice constants between the epitaxial layer and the substrate creates misfit dislocations in the epitaxial layers when the film thickness reaches a certain thickness, namely the critical thickness. The misfit dislocations extend until they reach the edge of the wafer or the surface of the epitaxial layer during growth. The section of dislocation moving through the entire epilayer thickness is referred to as threading dislocation, and is detrimental to device performance.

Theories and some experimental results (e.g., M. Tachikawa, et al., Appl. Phys. Lett. 56, 2225, 1990 ) demonstrate that the formation and movement of a large number of dislocations in heterogeneous epitaxial materials often happens in the cooling stage after growth. This is true when the thermal expansion coefficient of the epitaxial layer is larger than that of the substrate, e.g., GaAs on Si. The large difference between the thermal expansion coefficients of the epitaxial layer and substrate (e.g., GaAs on Si ) produces a thermal stress strong enough to generate and move dislocations. The thermal stress induced dislocations and concurrent dislocation propagation to the epitaxial layer surface is the main mechanism of dislocation generation in the cooling stage. It should be noted that in the GaAs on Si case, the GaAs epitaxial layer is always in tensile stress during cooling. Based on the mechanical properties of thin films and experimental results, the film in tension always causes plastic deformation problems, besides microscopic dislocations, such as macroscopic cracking and dehesion (or debonding). The film in compression can also create dislocations, but the movement of dislocations to the surface of epitaxial layers is suppressed by compressive thermal stress, which does not cause the cracking problem. This discussion is also applicable to heterogeneous material bonding. Since the role of the lattice constant is understood, we concentrate on the role of thermal stress here.

High quality integration of heterogeneous materials with large differences in thermal expansion coefficients and lattice constants, such as GaAs on Si, by means of wafer bonding technologies is a serious problem. Many research groups all over the world are pursuing this target. To realize the target we tried several different technologies, including:

1) direct bonding,
2) thin intermediate metal film bonding, and
3) RT (room temperature) bonding.

Direct bonding is conducted under high temperature and high pressure. Our experimental results indicate that the bonded wafers have very strong bonding strength but the wafers often crack or fracture into small pieces due to strong thermal stress. Obviously we cannot create a compliant composite substrate by using this technology.

Bonding by thin intermediate metal film can be implemented at high temperatures and pressures. We chose a metal, such as Cr, with a high melting point and good adhesion to semiconductors as the intermediate material. The crack and fracture problem seems to be alleviated to some extent, but the bonding strength is not strong enough to withstand the thermal stress generated. Debonding often occurred.

RT bonding is a new technology for heterogeneous material integration at room or low temperature and under low pressure. We achieved a bonding interface thermally stable up to 700° C. Even though this technology works well, a substrate bonded by this method is still unable to function as a compliant substrate and thermal stress self-adjuster during growth.

SUMMARY OF THE INVENTION

This invention discloses a novel reliable technology termed Semiconductor Eutectic Alloy Metal (SEAM) technology for high quality integration of heterogeneous materials and fabrication of compliant composite substrates or stress-engineered substrates. Using the SEAM technology, a high quality composite substrate possesses excellent thermal stability to withstand high temperature thermal cycling from room temperature to 900° C. without degradation of crystal quality. These compliant composite substrates, acting as the self-adjuster of thermal stress, can meet the requirements for high quality heteroepitaxial growth. This technology can be extensively applied to integration of semiconductor-semiconductor, semiconductor-metal, and other material systems in which high quality crystal surface, excellent thermal stability, and good mechanical property are required for fabrication and packaging of electronic and optoelectronic devices and circuits.

Briefly stated, a method of semiconductor eutectic alloy metal (SEAM) technology for integration of heterogeneous materials and fabrication of compliant composite substrates takes advantage of eutectic properties of alloys. Sub1 and Sub2 are used to represent the two heterogeneous materials to be bonded or composed into a compliant composite substrate. For the purpose of fabricating compliant composite substrate, the first substrate material (Sub1) combines with the second substrate material (Sub2) to form a composite substrate that controls the stress in the epitaxial layers during cooling. The second substrate material (Sub2) controls the stress in the epitaxial layer grown thereon so that it is compressive during annealing. A joint metal (JM) with a melting point of $T_m$ is chosen to offer variable joint stiffness at different temperatures. JM and Sub1 form a first eutectic alloy at a first eutectic temperature $T_{eu1}$ while JM and Sub2 form a second eutectic alloy at a second eutectic temperature $T_{eu2}$. $T_{m1}$ and $T_{m2}$ are the melting points of Sub1 and Sub2, respectively. The following condition should be met: $T_{m1}$, $T_{m2} > T_m > T_{eu1}$, $T_{eu2}$. After cleaning of Sub1 and Sub2, JM is deposited on the bonding sides of Sub1 and Sub2. After preliminary bonding by applying force to press the bonding surfaces together at room temperature, high temperature bonding is subsequently performed, during which the temperature is ramped up to a temperature equal to or higher than $T_m$. During cooling, JM solidifies first, after which two eutectic alloys solidify.

According to an embodiment of the invention, a method for integrating two heterogeneous materials or forming a compliant composite substrate includes the steps of: (a) selecting a first substrate material (Sub1); (b) selecting a second substrate material (Sub2); (c) selecting a joint metal (JM) with a melting point of $T_m$; wherein JM and Sub1 form a first eutectic alloy at a first eutectic temperature $T_{eu1}$ while JM and Sub2 form a second eutectic alloy at a second eutectic temperature $T_{eu2}$; with the condition that $T_m > T_{eu1}$ and $T_{eu2}$; (d) depositing JM on a side of Sub1 to form a first intermediate substrate; (e) depositing JM on a side of Sub2 to form a second intermediate substrate; (f) forming a substrate pair by combining said first and second intermediate substrates such that said sides of Sub1 and Sub2 having JM on them are against each other; (g) ramping the temperature of said substrate pair up at least $T_m$, passing through $T_{eu1}$ and $T_{eu2}$; and (h) cooling, after step (g), said substrate pair to form said compliant composite substrate.

DESCRIPTION OF THE PREFERRED EMBODIMENT

Figure 1:
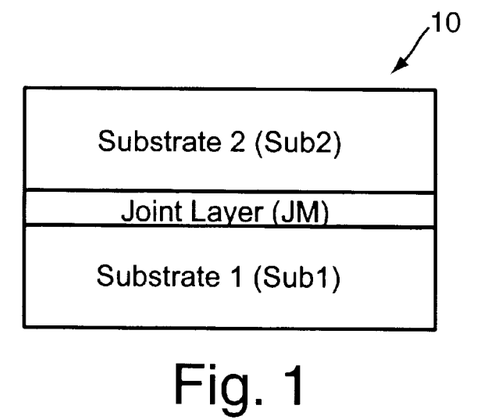
FIG. 1 shows an integrated heterogeneous material system or a compliant composite substrate used in explaining the method of the present invention.

Referring to FIG. 1, a compliant composite substrate 10 includes two semiconductor (or other type material) substrates, substrate1 (designated as Sub1) and substrate2 (designated as Sub2), with different lattice constants, thermal expansion coefficients, and thicknesses. They are combined together through a joint thin layer material (designated as JM). The Sub2 controls the stress in an epitaxial layer grown thereon so that it is compressive during annealing. The Sub1 combines with Sub2 to form the composite substrate that controls the stress in epitaxial layers during cooling. The JM offers variable joint strengths at different temperatures. Compliant composite substrate 10 must satisfy three conditions: (1) have enough stiffness for the subsequent growth and device processes; (2) does not crack or debond, and (3) possesses sufficiently good crystal quality for epi-growth, as with a conventional substrate. Compliant composite substrate 10 has an exclusive feature, i.e., it is capable of maintaining the epitaxial layers grown thereon under compressive or zero stress for positive mismatch over the entire temperature range to minimize the dislocation density in the epitaxial layers.

To realize high quality integration of heterogeneous materials and fabricate the compliant composite substrates by using SEAM technology, we must first choose a proper heterogeneous wafer combination (Sub1 and Sub2) to match the requirement of creating the desired thermal stress in the epitaxial layers. The primary material properties that must be considered are the lattice constant, thermal expansion coefficient, melting point, modulus of elasticity, and wafer thickness.

The selection of the joint layer material JM (metal or alloy) is another key issue. The main properties of the joint layer material are the melting point and the temperatures at which the eutectic alloys between JM and Sub1 and Sub2 are formed. The thickness of JM is also an important factor for high quality bonding. A JM which is too thin cannot function well as a stress buffer; therefore, an appropriate thickness of JM should be chosen.

Figure 2:
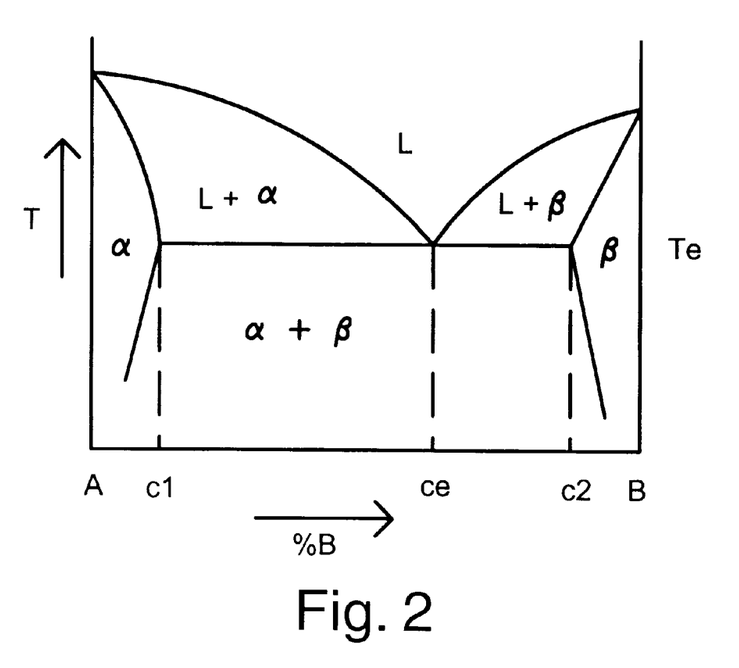
FIG. 2 shows a schematic eutectic phase diagram between components A and B.

Referring to FIG. 2, a eutectic phase diagram between components A and B is shown. An eutectic reaction is a transformation of a liquid solution to two or more solids under a constant pressure and a constant temperature $T_e$. The central liquid phase L is above the eutectic temperature line $T_e$. α and β are the two solid phases for components A and B. The eutectic alloy at $c_e$ has the lowest melting point of any mixture of components A and B. The eutectic composition solidifies with the simultaneous crystallization of α and β.

In order to describe the relationship between the thermal stress-buffer effect and the material parameters, we define a stress-buffer factor F as $$F = \frac{t}{D \Delta \alpha / \alpha} \quad [1]$$

where t is the joint layer thickness, D is the wafer size, i.e., the dimension or diameter of the wafers to be bonded, and $\Delta \alpha / \alpha$ is the ratio of the thermal mismatch between Sub1 and Sub2. The "dimension" D is defined as the diameter for a circular wafer, as the edge dimension for a square wafer, and as the long edge dimension for a rectangular wafer. F is an indication of the ability of sustaining the thermal stress for bonded wafers. The results of our experiments demonstrate that the factor $F > 10^{-4}$ corresponds with the requirement of good bonding. The larger the value of F, the higher tendency the good bonding should be. Moreover three temperatures, named the characteristic temperatures, which characterize the process are:

$T_{eu1}$, the eutectic point 1 at which an eutectic alloy forms between the joint metal and substrate1, $T_{eu2}$, the eutectic point 2 at which an eutectic alloy forms between the joint metal and substrate2, and $T_m$, the melting point of the joint metal.

In general, we have $T_m > T_{eu2}$, $T_{eu1}$ for material systems with eutectic. Since this is true for all binary alloy systems except in a few cases, this condition is always met for purposes of this invention. The value of $T_{eu1}$ or $T_{eu2}$ is determined by the phase diagram of the JM and Sub1 or Sub2 binary systems. For convenience, we arbitrarily choose the composite material system with $T_{eu2} > T_{eu1}$.

Before bonding, the joint metal JM is deposited to the bonding surface of Sub1 and Sub2. During the heating of the bonding process, when the temperature T is lower than $T_{eu1}$, JM and Sub1 maintain their original solid state. When the temperature T is equal to or larger than $T_{eu1}$, the atom inter-diffusion between Sub1 and JM is enhanced and a melt is formed at the interface with a certain composition. When the temperature T increases, the composition of the melt changes following the liquidus of the phase diagram of the JM and Sub1 binary system. When the temperature T reaches $T_{eu2}$, a similar phenomenon happens. After that, we increase the temperature further up to $T_m$ or slightly higher, at which point the joint metal melts and the uniform stress buffer layer forms. The Sub2 is floating on the melted JM and the Sub1, where it serves as the actual substrate for epitaxial layers grown thereon. This is one of the substantial difference between SEAM technology and routine eutectic bonding such as that disclosed in R. Venkatasubramanian, et al., Appl. Phys. Lett. 60, 886, 1992.

During the cooling phase of the bonding process, the uniform joint metal layer solidifies first when the temperature lowers to $T_m$. When the temperature lowers to $T_{eu2}$ and $T_{eu1}$, the second eutectic alloy and the first eutectic alloy solidify in turn, forming a rigid bonding at the interface of both sides. After that, the system no longer has phase changes. The epitaxial layers then see the entire composite substrate (Sub2+JM+Sub1). The thermal expansion coefficient of the composite substrate is the weighted-average of the thermal expansion coefficients and the thicknesses of Sub1 and Sub2. We thus realize a high quality integration of heterogeneous materials whereby a compliant composite substrate is created.

The effective thermal expansion coefficient $\alpha_{eff}$ of the composite substrate can be expressed, neglecting the bending of wafers, as $$\alpha_{eff}=(\alpha_1 M_1 t_1+\alpha_2 M_2 t_2)/(M_1 t_1+M_2 t_2) \quad [2]$$

where $\alpha_1,\alpha_2$ are the thermal expansion coefficients of Sub1 and Sub2, $t_1$ and $t_2$ are the thicknesses of Sub1 and Sub2, and $M_1$, $M_2$ are the biaxial elastic moduli of Sub1 and Sub2, respectively. In the case of $M_1$ being approximately equal to $M_2$, Equation [2] simplifies to $$\alpha_{eff}=(\alpha_1 t_1+\alpha_2 t_2)/(t_1+t_2) \quad [3]$$

Thicknesses $t_1$ and $t_2$ are chosen, taking into consideration $\alpha_1$ and $\alpha_2$, such that $\alpha_{eff}$ is close to the thermal expansion coefficient of the desired epitaxial layers to be grown on the composite substrate.

This technology can be extensively applied to the integration of semiconductor-semiconductor, semiconductor-metal, and other material systems, in which high quality crystal surfaces, excellent thermal stability, and good mechanical properties are required for fabricating or packaging electronic and optoelectronic devices and circuits. Once the materials to be integrated are provided, the appropriate joint material is selected which forms a material system (Sub2+JM+Sub1) with proper characteristic temperatures $T_{eu1}$, $T_{eu2}$ and $T_m$ based on their phase diagrams and the requirements of material integration.

Figure 3:
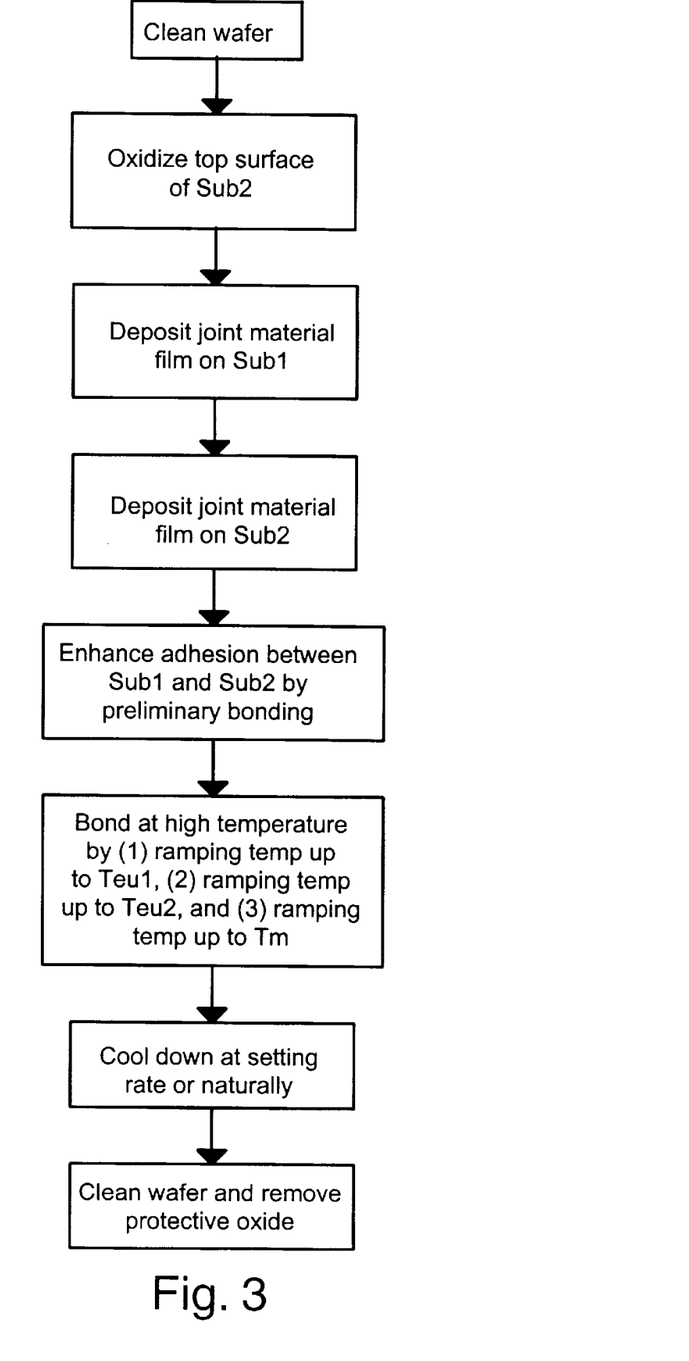
FIG. 3 shows a process chart outlining the method of the present invention.

Referring to FIG. 3, the following are the preferred steps of the process of the invention.

1) Cleaning the wafer by solvent cleaning for degreasing and chemical etching for cleaning and deoxidizing the bonding surface.

2) Depositing or forming an oxide layer on the top surface of Sub2 to provide protection for epitaxial growth by using PECVD or thermal oxidation.

3) Depositing the joint material film on the bonding surfaces of Sub1 and Sub2 by using thermal or e-beam evaporation or sputtering. The total film thickness should be chosen to be larger than a lower-limited value for thermal stress buffering which is described by equation [1]. The thicker film should be used for the bigger wafer.

4) Enhancing the adhesion between Sub1 and Sub2 through JM by preliminary bonding.

5) Bonding at high temperature by (a) placing the preliminary bonded substrate pair in the bonding chuck and apply proper pressure to substrate pair for enhancing bonding as well as avoiding crystal surface damage, (b) loading the bonding chuck into the furnace, either in high vacuum (which requires pumping down to the high vacuum level) or in inert ambience, such as in argon or nitrogen, (c) ramping the temperature up to $T_{eu1}$ at the set rate, typically a moderate rate such as 10° C./min, (d) ramping the temperature up to $T_{eu2}$ at the set rate, (e) continuously ramping the temperature up to $T_m$ or slightly higher at the set rate and soak for a period of time, and (f) cooling at the set rate or by natural heat dissipation.

6) Cleaning the wafer and removing the protection oxide on the top surface of the bonded composite substrate so that it is ready for epitaxial growth.

Figure 4:
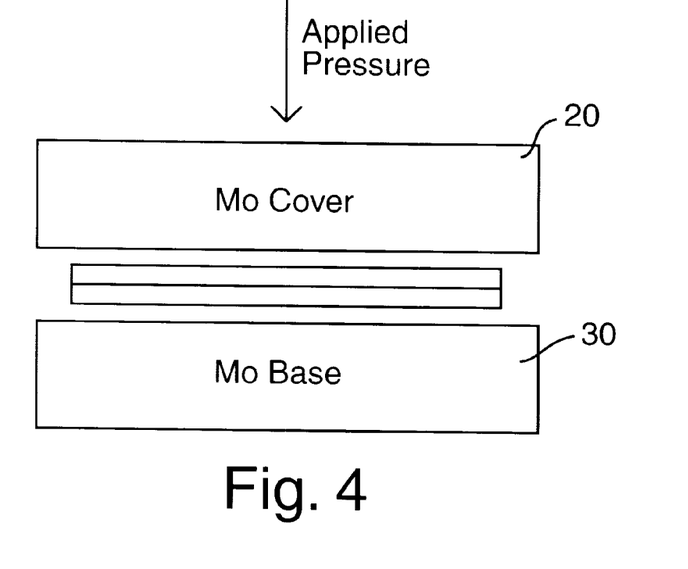
FIG. 4 shows a high temperature bonding fixture made of molybdenum.

Referring to FIG. 4, the high temperature bonding is preferably done in a bonding fixture made of Molybdenum which includes a cover 20 and a base 30. The pressure can be achieved by weigh or via a mechanical mechanism. A conventional vacuum furnace is appropriate for bonding. The main requirements are $P<1\times10^{-6}$ torr, $T>1,200°$ C. (depending on the characteristic temperatures of material system), and nitrogen or argon purging.

Figure 5:
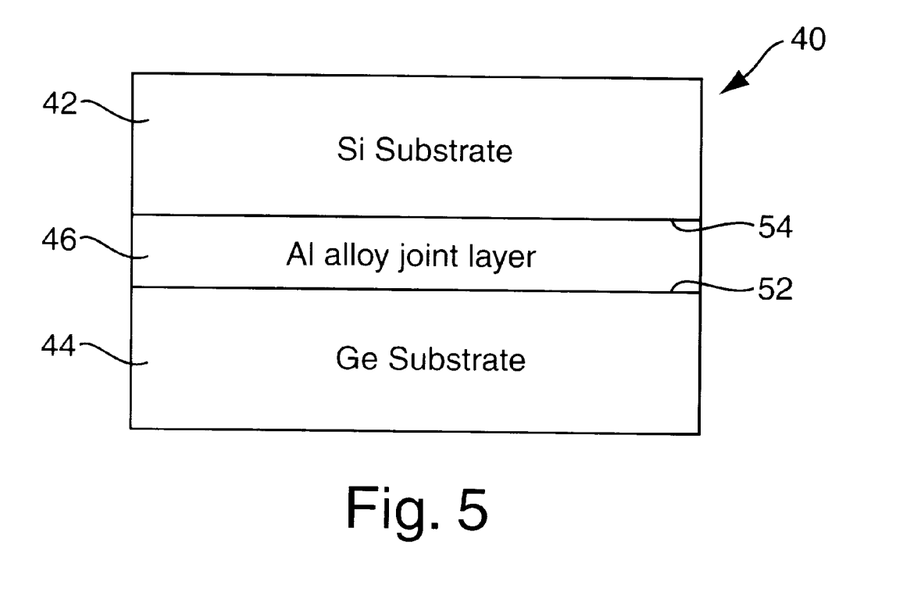
FIG. 5 shows a compliant composite substrate with a Si top and a Ge bottom.

Referring to FIG. 5, a product of the process of the present invention is shown. High quality InP-based compound epitaxial layers on a Si (or Ge) substrate offer many potential attractive applications to optical and electronic devices, such as solar cells, high speed transistors such as HBT, laser diodes, photodetectors, etc. We therefore refer to the fabrication of a Si/Ge compliant composite substrate 40 as an example. Compliant composite substrate 40 includes a Si top substrate 42 (Sub2 in FIG. 1) and a Ge bottom substrate 44 (Sub1 in FIG. 1) with a thin alloy joint layer 46 of Al (JM in FIG. 1) in between.

Based on the binary phase diagrams of Ge—Al and Si—Al systems (found, e.g. in Massalski, Thomas B. (editor-in-chief), *Binary Alloy Phase Diagrams*, 2d edition, ASM International), the characteristic temperatures for this composite substrate are:

| Ge-Al     | 420° C.   | eutectic temperature ($T_{eu1}$) |
| --------- | --------- | -------------------------------- |
| Si-Al     | 577° C.   | eutectic temperature ($T_{eu2}$) |
| Al + 1% Si | ~660° C. | melting temperature ($T_m$)      |
| Ge        | ~938° C.  | melting temperature ($T_{m1}$)   |
| Si        | ~1414° C. | melting temperature ($T_{m2}$)   |

The lattice constants of Ge and Si are 5.65 Å and 5.43 Å, respectively, while the thermal expansion coefficients are $5.8\times10^{-6}$ and $2.6\times10^{-6}$ respectively. Thicknesses of 12–14 mil for Ge and 6–10 mil for Si substrate are selected for making the effective average thermal expansion coefficient to be closely equal to that of InP. For the Ge—Si composite substrate, substituting the following data into Equation [3]: $\alpha_1=5.8\times10^{-6}$, $\alpha_2=2.6\times10^{-6}$, $t_1=14$ mil, and $t_2=10$ mil, we obtain $\alpha_{eff}=4.5\times10^{-6}$. As expected, it is closely equal to that of InP ($4.5\times10^{-6}$) which is the material to be grown thereon.

Referring also to FIG. 3, the processing flow of Si/Ge compliant substrate 40 is accomplished by the following steps.

1) Before depositing or forming the protective oxide layer, the Si wafer is cleaned by passing through all steps listed here. After that, the Si wafer doesn't need to be cleaned again before sputtering. The same cleaning steps are performed for the Ge wafer before sputtering except that the Ge wafer does not need the RCA treatment.

Aceton/isopropanol or methanol ultrasonic cleaning, repeating if necessary, followed by DI $H_2O$ rinsing RCA1($1NH_4OH/1H_2O_2/5H_2O$) and RCA2($1HCL/1H_2O_2/5H_2O$) 75° C., 10 min, followed by DI $H_2O$ rinsing for the Si wafer cleaning before oxide deposition 1HF/10 $H_2O$ dip 30 sec DI $H_2O$ rinsing $N_2$ blow dry 2) Deposit approximately 3,000 Å PECVD oxide or form 500 Å–1,000 Å of thermal oxide film on the growth surface of the double polished Si wafer for protection.

3) Sputter Al+1% Si alloy film on both Ge bonding surface 52 and Si bonding surface 54. The suitable film thickness range of joint layer 46 is experimentally found to be greater than 2000 Å on one side (total thickness>4,000 Å) for 1 $cm^2$ wafers. The stress buffer factor F based on equation [1] is about $10^{-4}$ in this case.

It should be emphasized that Al+1% Si alloy is chosen as the joint material rather than pure Al metal to avoid the diffusion spiking effect of Si into Al during alloying. Spiking causes non-uniform distribution of thermal stress.

4) Preliminary bonding at room temperature is performed after the sputter deposition of the Al alloy for joint layer 46. Si and Ge wafers 42, 44 are brought together face to face and put in a vise fixture with proper pressure applied. "Proper" means that the pressure serves to enhance the adhesion between Si and Ge wafers without damaging the wafers. In the experiments described herein, approximately 10 psi pressure was used.

5) High temperature bonding is performed as follows. The room temperature bonded Si/Ge wafer pair is placed in a bonding chuck made of molybdenum and low pressure (less than 2 psi) is applied to the wafer pair. The bonding chuck is loaded in the bonding furnace. The vacuum pressure is then reduced to $\sim 1 \times 10^{-6}$ torr. The furnace is heated, with the temperature in turn passing through 420° C. ($T_{eu1}$), 577° C. ($T_{eu2}$) and 660° C. ($T_m$) until the temperature reaches 700° C. The ramp rate used is approximately 10° C./min. Then the substrate 40 is soaked at 700° C. for approximately a half hour to one hour. After soaking, substrate 40 is cooled down to room temperature naturally. During cooling, the Al, Si—Al and Ge—Al eutectic alloys, in turn, solidify and rigid joints are formed at both the Si and Ge sides of joint layer 46.

The Al layer serves as a buffer to relieve the thermal stress and as a self-switch to adjust the substrate status from "composite" to "single" or vice versa during epitaxial growth.

Figure 6:
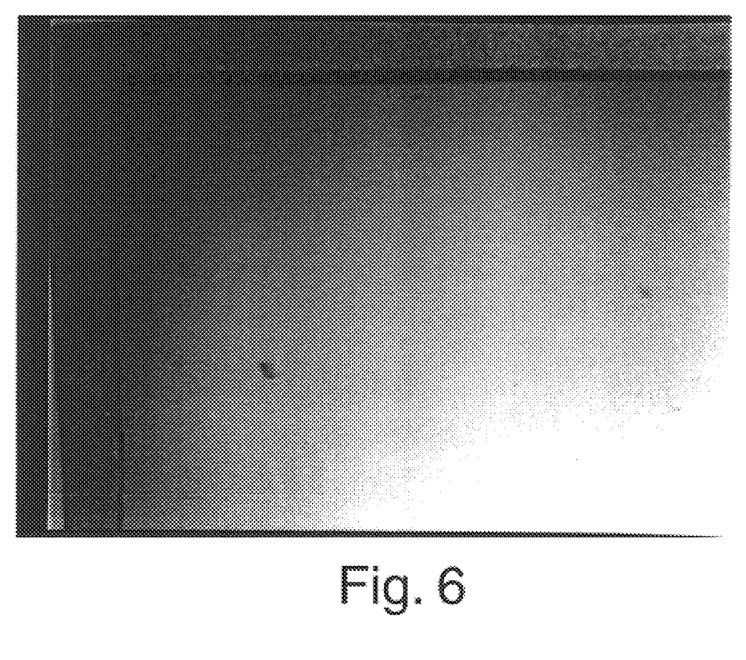
FIG. 6 shows a photograph of a Si/Ge compliant composite substrate made according to the method of the present invention.
Figure 7:
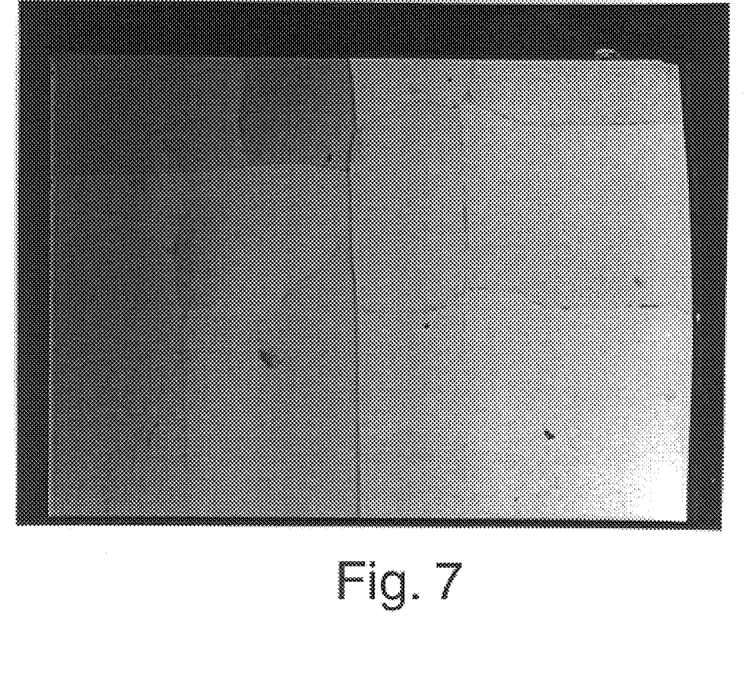
FIG. 7 shows a photograph of a Si/Ge composite substrate with serious cracking made using conventional bonding techniques.

The high quality Si/Ge compliant composite substrates which satisfy the demands for growth of InP-based compound epitaxial layers have been produced. The photograph in FIG. 6 shows a Si/Ge compliant composite substrate made according to the method of the present invention. The photograph of a Si/Ge composite substrate with serious cracking made by using conventional bonding technologies is shown in FIG. 7 for comparison.

Figure 8:
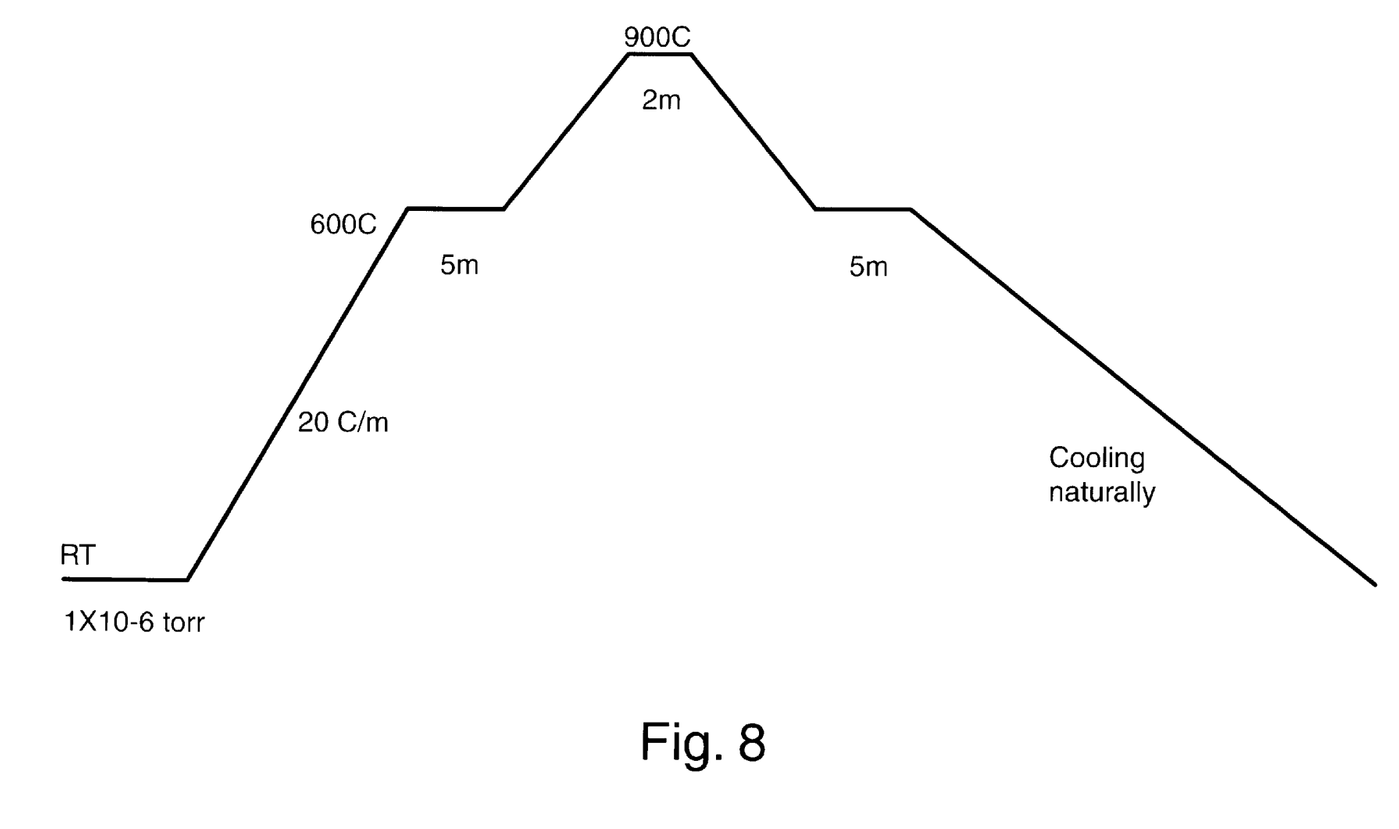
FIG. 8 shows a temperature profile of a high temperature annealing test applied to the compliant composite substrate made according to the method of the present invention.
Figure 9:
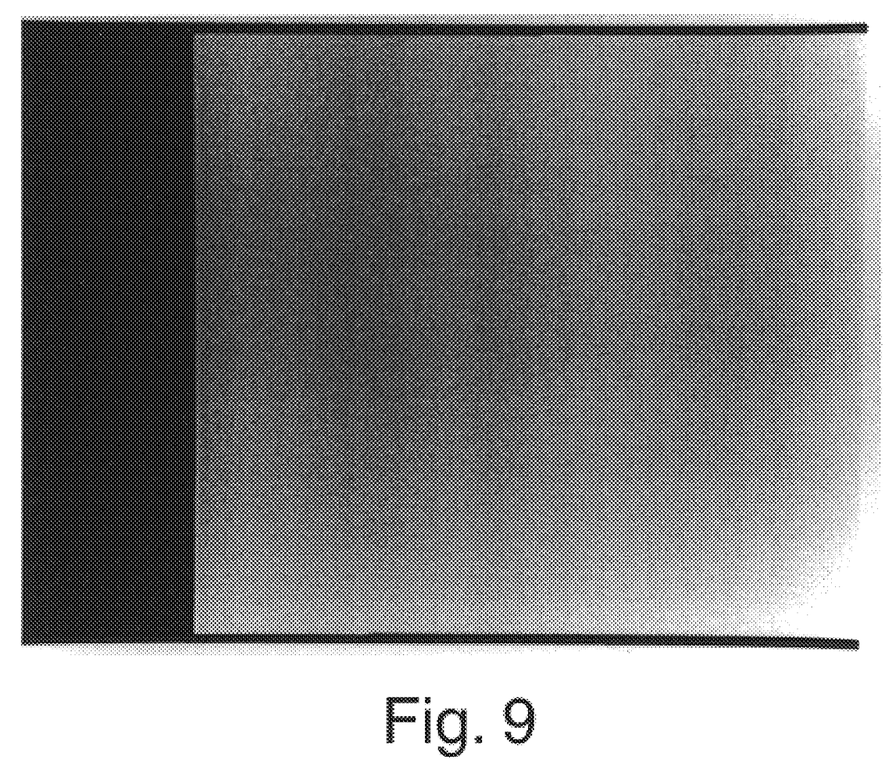
FIG. 9 shows a photograph of the Si/Ge compliant composite substrate made according to the method of the present invention after thermal annealing up to 900° C.

To check the thermal stability, a high temperature thermal annealing test is conducted on the bonded composite substrate. The temperature profile for the annealing test is shown in FIG. 8. The highest temperature reached is 900° C. Even under this severe condition, the composite substrates show no degradation after thermal annealing. The photograph in FIG. 9 shows Si/Ge compliant composite substrate 40 after thermal annealing up to 900° C.

6) The suitable pre-growth wafer cleaning procedure for Si/Ge composite substrate 40 was experimentally determined as follows:
  a) Thorough solvent cleaning.
  b) Immerse in RCA1 ($1NH_4OH/1H_2O_2/5H_2O$) at 60° C. for 5 minutes.
  c) DI $H_2O$ rinsing.
  d) Immerse in RCA2 ($1HCl/1H_2O_2/5H_2O$) at 60° C. for 5 minutes.
  e) DI $H_2O$ rinsing.
  f) Dip in b $1HF/1H_2O$ for 30 seconds.
  g) DI $H_2O$ rinsing.
  h) Blow dry in $N_2$.

Accordingly, it is to be understood that the embodiments of the invention herein described are merely illustrative of the application of the principles of the invention. Reference herein to details of the illustrated embodiments are not intended to limit the scope of the claims, which themselves recite those features regarded as essential to the invention.

What is claimed is:

1. A method for forming a wafer of a compliant composite substrate, comprising the steps of:
  a) selecting a first substrate material having a melting point of $T_{m1}$;
  b) selecting a second substrate material having a melting point of $T_{m2}$;
  c) selecting a joint metal with a melting point of $T_m$; wherein
    i) said joint metal and said first substrate material form a first eutectic alloy at a first eutectic temperature $T_{eu1}$ while said joint metal and said second substrate material form a second eutectic alloy at a second eutectic temperature $T_{eu2}$; and
    ii) $T_{m1}$ and $T_{m2} > T_m > T_{eu1}$ and $T_{eu2}$;
  d) depositing said joint metal on a side of said first substrate material to form a first intermediate substrate;
  e) depositing said joint metal on a side of said second substrate material to form a second intermediate substrate;
  f) forming a substrate pair by combining said first and second intermediate substrates such that said sides of said first substrate material and said second substrate material having said joint metal on them are against each other;
  g) ramping a temperature of said substrate pair up to at least $T_m$, whereby said temperature passes through $T_{eu1}$ and $T_{eu2}$; and
  h) cooling, after step (g), said substrate pair to form said compliant composite substrate.

2. A method according to claim 1, further comprising enhancing adhesion between said first and second intermediate substrates by preliminarily bonding said substrate pair.

3. A method according to claim 1, wherein the steps of ramping and cooling are conducted in a high vacuum.

4. A method according to claim 1, further comprising soaking said substrate pair, after step (g) and before step (h), for a specified period of time at a temperature equal to or greater than $T_m$.

5. A method according to claim 1, further comprising forming a protective layer, before step (d), on said second substrate material on which epitaxial layers are to be grown.

6. A method according to claim 1, wherein said first substrate material is Ge and said second substrate material is Si.

7. A method according to claim 6, wherein said joint metal is Al+1% Si.

8. A method according to claim 1, further comprising selecting a first thickness of said joint metal deposited in step (d) and a second thickness of said joint metal deposited in step (e) such that a total thickness (t) of said joint metal is the sum of said first thickness and said second thickness, and said total thickness (t) satisfies an equation $t \geq D\, \Delta\alpha/\alpha \times 10^{-4}$, where D is a dimension of said wafer, and $\Delta\alpha/\alpha$ is a ratio of a thermal mismatch between Sub1 and Sub2 which equals $|(\alpha_1-\alpha_2)|/\frac{1}{2}(\alpha_1+\alpha_2)$.

9. A method according to claim 8, further comprising selecting $\alpha_{\it eff}$ such that $\alpha_{\it eff}$ is approximately equal to a thermal expansion coefficient of an epitaxial layer to be grown on said composite substrate.

10. A method according to claim 1, further comprising selecting a first thickness of said first substrate material and a second thickness of said second substrate material such that:

$$\alpha_{\it eff}=(\alpha_1 t_1+\alpha_2 t_2)/(t_1+t_2)$$

where $\alpha_{\it eff}$ is a thermal expansion coefficient of said composite substrate, $\alpha_1$ is a thermal expansion coefficient of said first substrate material, $\alpha_2$ is a thermal expansion coefficient of said second substrate material, $t_1$ is said first thickness of said first substrate material, and $t_2$ is said second thickness of said second substrate material.

11. A method according to claim 10, further comprising selecting $\alpha_{\it eff}$ such that $\alpha_{\it eff}$ is approximately equal to a thermal expansion coefficient of an epitaxial layer to be grown on said composite substrate.

12. A method according to claim 1, further comprising selecting said first substrate material and said second substrate material such that:

$$\alpha_{\it eff}=(\alpha_1 t_1+\alpha_2 t_2)/(t_1+t_2)$$

where $\alpha_{\it eff}$ is a thermal expansion coefficient of said composite substrate, $\alpha_1$ is a thermal expansion coefficient of said first substrate material, $\alpha_2$ is a thermal expansion coefficient of said second substrate material, $t_1$ is said first thickness of said first substrate material, and $t_2$ is said second thickness of said second substrate material.

13. A method according to claim 12, further comprising selecting $\alpha_{\it eff}$ such that $\alpha_{\it eff}$ is approximately equal to a thermal expansion coefficient of an epitaxial layer to be grown on said composite substrate.

14. A method for forming a wafer of a compliant composite substrate, comprising the steps of:
a) selecting as a first substrate material Ge having a melting point of $T_{Ge}$;
b) selecting as a second substrate material Si having a melting point of $T_{Si}$;
c) selecting a joint metal with a melting point of $T_m$; wherein
   i) said joint metal and said first substrate material form a first eutectic alloy at a first eutectic temperature $T_{eu1}$ while said joint metal and said second substrate material form a second eutectic alloy at a second eutectic temperature $T_{eu2}$; and
   ii) $T_{Ge}$ and $T_{Si} > T_m > T_{eu1}$ and $T_{eu2}$;
d) depositing said joint metal on a side of said first substrate material to form a first intermediate substrate;
e) depositing said joint metal on a side of said second substrate material to form a second intermediate substrate;
f) forming a substrate pair by combining said first and second intermediate substrates such that said sides of said first substrate material and said second substrate material having said joint metal on them are against each other;
g) ramping a temperature of said substrate pair up to at least $T_m$, whereby said temperature passes through $T_{eu1}$ and $T_{eu2}$; and
h) cooling, after step (g), said substrate pair to form said compliant composite substrate.

15. A method according to claim 14, wherein said joint metal is Al+1% Si.

16. A method for forming a wafer of a compliant composite substrate, comprising the steps of:
a) selecting a first substrate material having a melting point of $T_{m1}$;
b) selecting a second substrate material having a melting point of $T_{m2}$;
c) selecting a joint metal with a melting point of $T_m$; wherein
   i) said joint metal and said first substrate material form a first eutectic alloy at a first eutectic temperature $T_{eu1}$ while said joint metal and said second substrate material form a second eutectic alloy at a second eutectic temperature $T_{eu2}$; and
   ii) $T_{m1}$ and $T_{m2} > T_m > T_{eu1}$ and $T_{eu2}$;
d) depositing said joint metal on a side of said first substrate material to form a first intermediate substrate;
e) depositing said joint metal on a side of said second substrate material to form a second intermediate substrate;
f) forming a substrate pair by combining said first and second intermediate substrates such that said sides of said first substrate material and said second substrate material having said joint metal on them are against each other;
g) ramping a temperature of said substrate pair up to at least $T_m$, whereby said temperature passes through $T_{eu1}$ and $T_{eu2}$; and
h) cooling, after step (g), said substrate pair to form said compliant composite substrate,
wherein said first substrate material and said second substrate material are selected such that:

$$\alpha_{\it eff}=(\alpha_1 t_1+\alpha_2 t_2)/(t_1+t_2)$$

where $\alpha_{\it eff}$ is a thermal expansion coefficient of at least one of said composite substrate and an epitaxial layer to be grown on said composite substrate, $\alpha_1$ is a thermal expansion coefficient of said first substrate material, $\alpha_2$ is a thermal expansion coefficient of said second substrate material, $t_1$ is said first thickness of said first substrate material, and $t_2$ is said second thickness of said second substrate material.

* * * * *